INVENTOR.
ANWAR K. CHITAYAT
BY James P. Malone

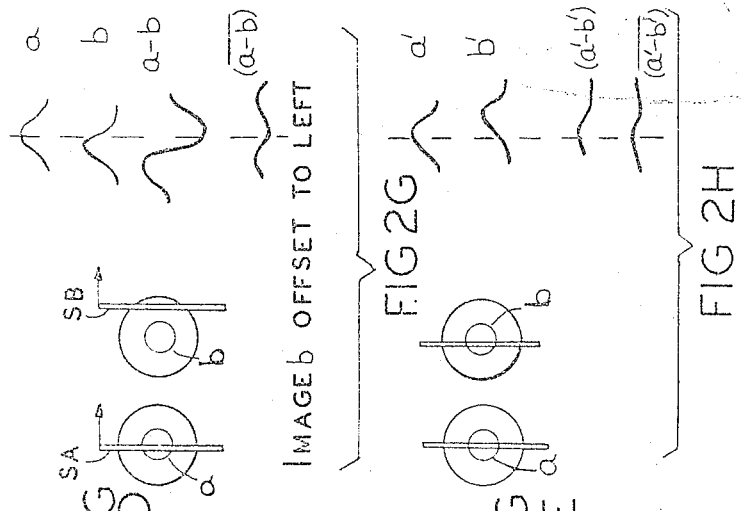
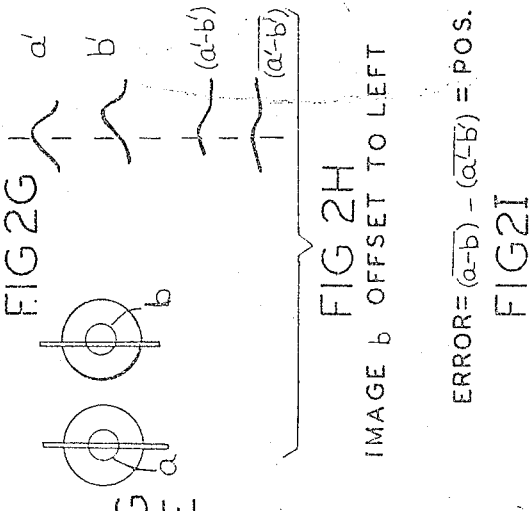
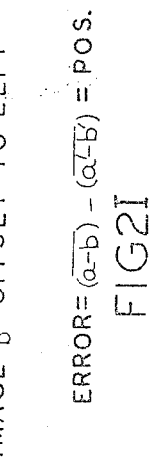
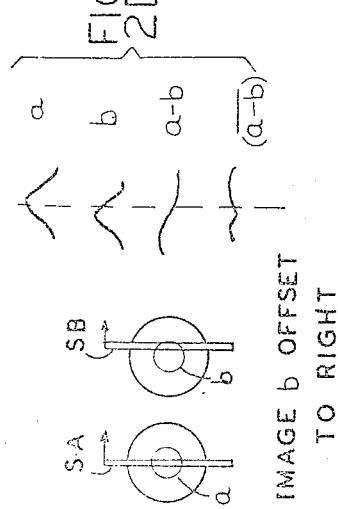
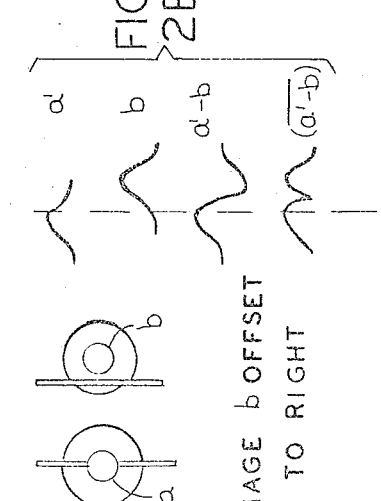
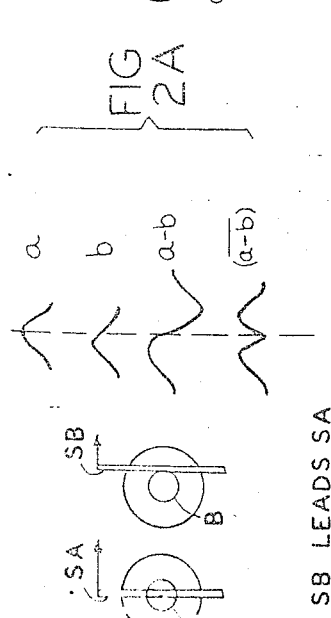
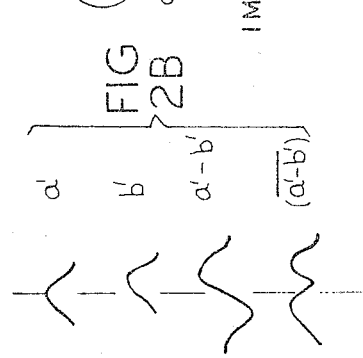
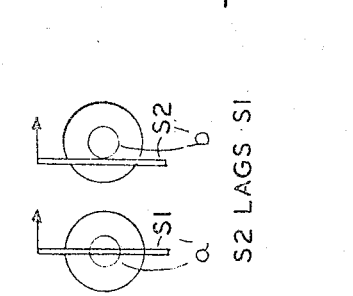
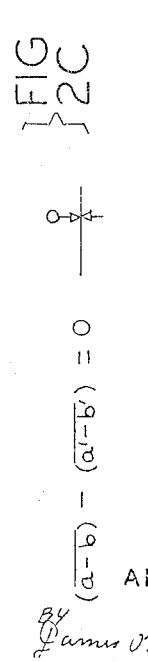
INVENTOR.
ANWAR K. CHITAYAT Y AXIS
FIG 3A
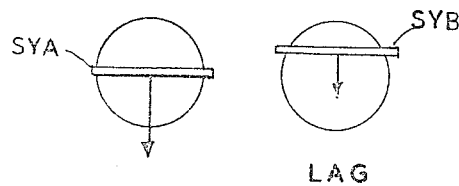
FIG 3B
ROTATION θ
FIG 3C
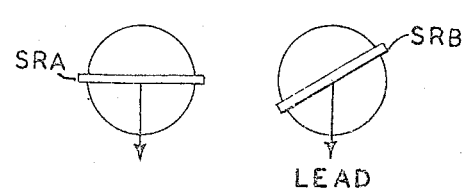
FIG 3D
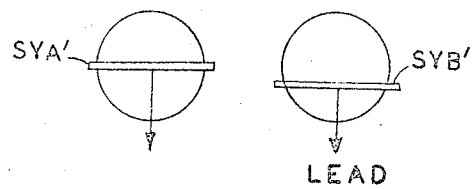
FIG 3E
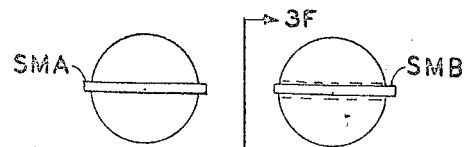
FIG 3G
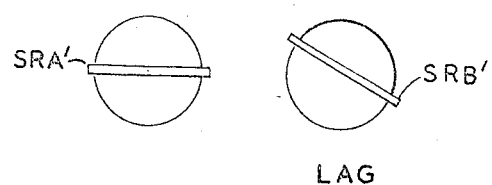
FIG 3F
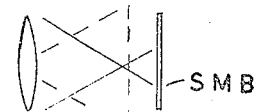
FIG 3H
MAGNIFICATION
INVENTOR.
ANWAR K. CHITAYAT
BY James P. Malone

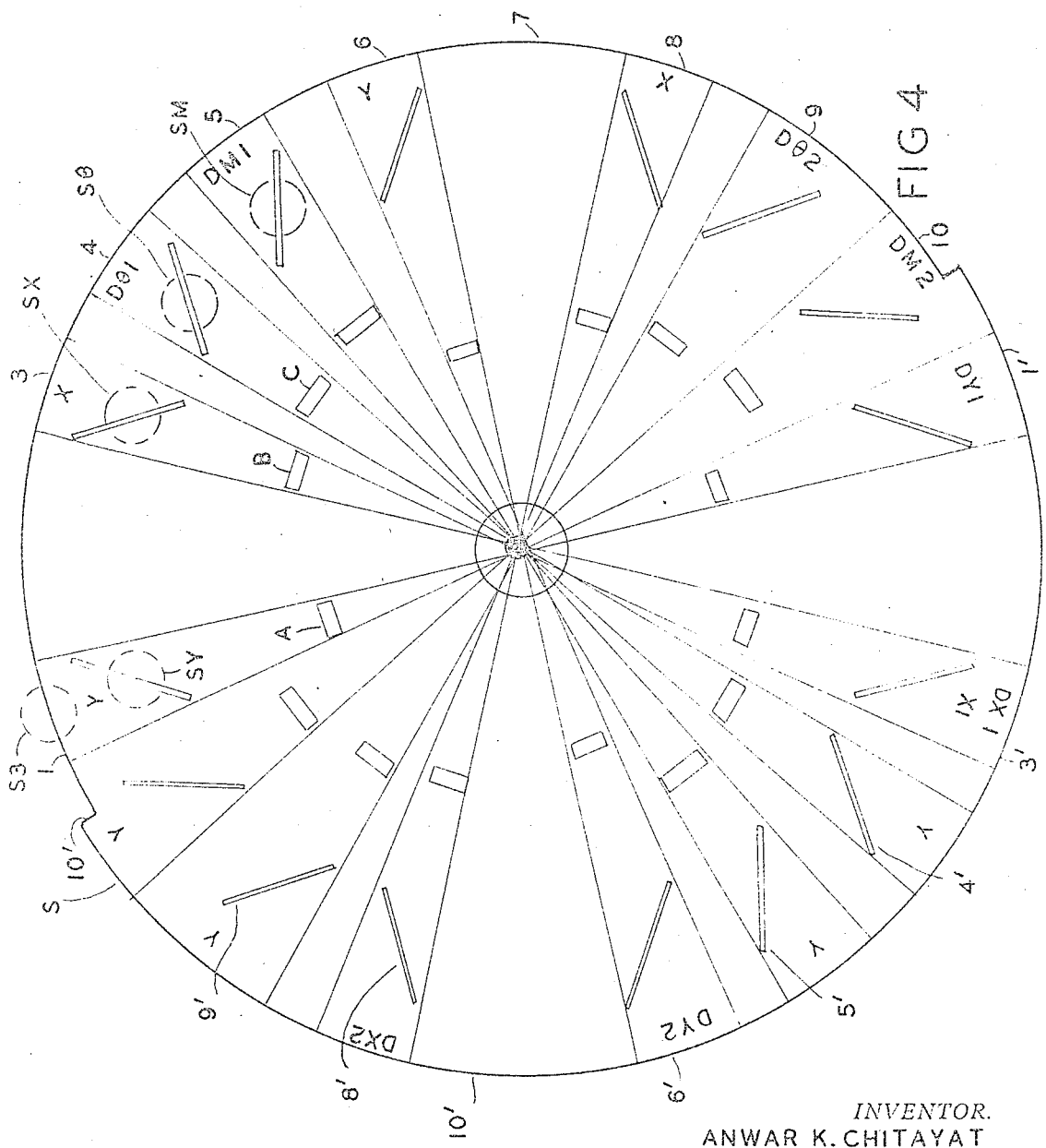

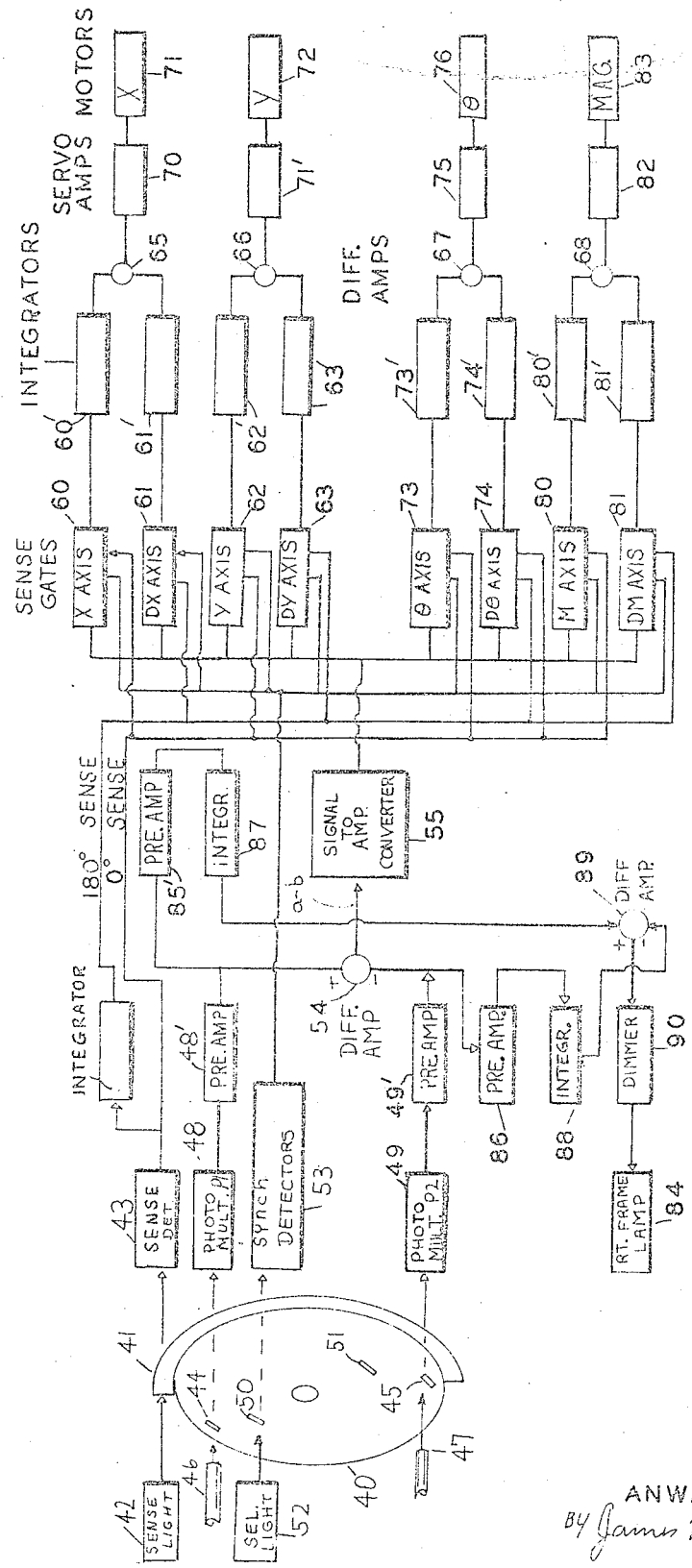

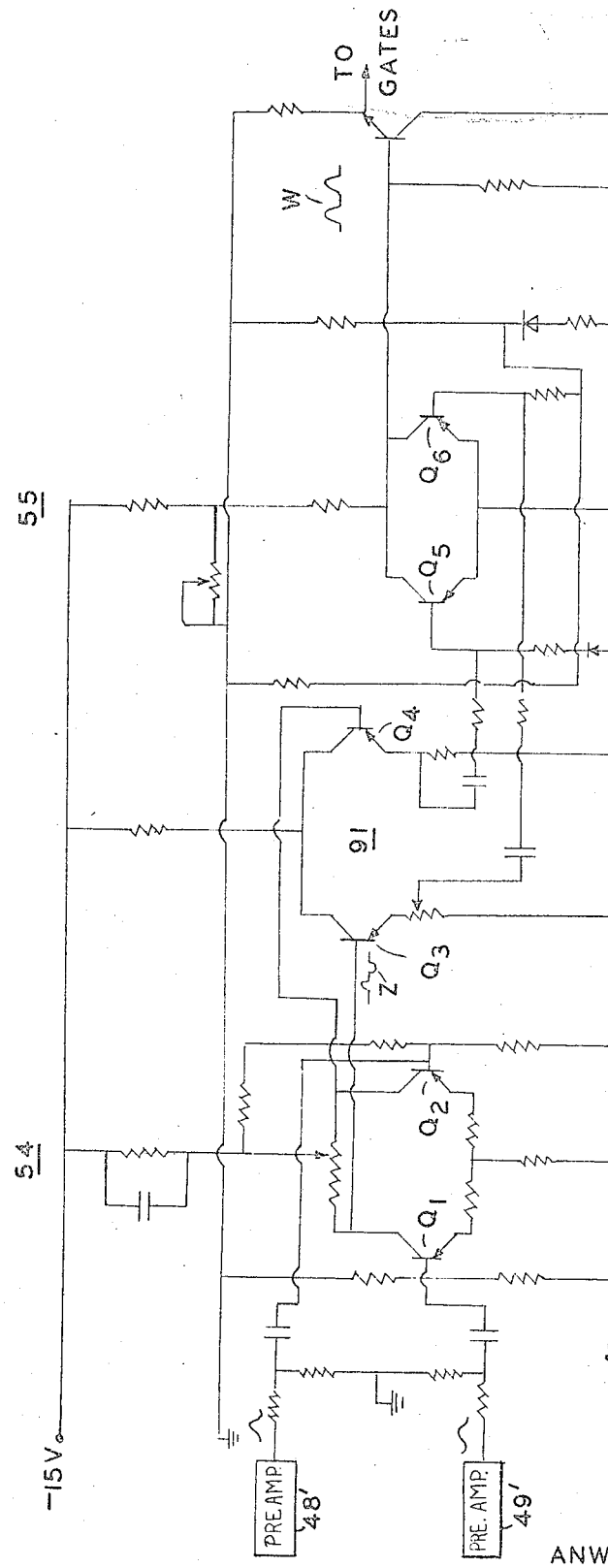

United States Patent Office 3,519,827
Patented July 7, 1970

3,519,827
SERVOMOTOR CONTROLLED POSITIONING MEANS FOR THE OPTICAL PICKUP IN STEREO VIEWERS USING FIBER OPTICS
Anwar K. Chitayat, Plainview, N.Y., assignor to OPTOmechanisms, Inc., Plainview, N.Y.
Filed July 11, 1967, Ser. No. 652,517
Int. Cl. H01j 39/12; G02b 27/22
U.S. Cl. 250—202
7 Claims

ABSTRACT OF THE DISCLOSURE

Automatic servo control signals are provided for left or right optical pickup in a stereo viewer. Signals proportional to misalignment of left and right optical pickups are produced by a scanning disc. The difference between the left and right signals is obtained and used to provide servo control signals. Separate signals are provided to correct misalignment along two coordinate axes and also to correct rotation misalignment of the pickups and unbalanced magnification of the left and right images.

---

This invention relates to means for providing servo control signals for aligning left and right optical pickups in a stereo viewer.

In interpreting aerial survey film it is desired to obtain good stereo viewing to provide depth of perception and improved detail. It is difficult for the operator to make all of the necessary adjustments manually and still give his full attention to studying the film. Once the target image is manually placed within the field of view of one pickup, the present invention automatically zero's in the other optical pickup and aligns it along two coordinate axes. It also corrects rotation misalignment and any unbalance in magnification between left and right pickups.

Accordingly, a principal object of the invention is to provide new and improved stereo viewing means.

Another object of the invention is to provide new and improved stereo viewing means and means to provide servo signal for automatically aligning left or right optical pickups on left or right images.

Another object of the invention is to provide new and improved stereo viewing means and means to provide servo signal for automatically aligning left or right optical pickups on left or right images including means to scan said images and means to compare said scan signals.

Another object of the invention is to provide new and improved stereo viewing means and means to provide servo signal for automatically aligning left or right optical pickups on left or right images including means to scan said images and means to compare said scan signals said scanning means being adapted to provide signals proportional to rotational misalignment of said pickups and difference in magnification of said left and right images.

These and other objects of the invention will be apparent in the following specification and drawing of which:

FIGS. 2A through 2I are diagrams illustrating the operation of the invention.

FIGS. 3A through 3H are diagrams illustrating the operation of the invention.

FIG. 4 is a view of the scanning disc.

FIG. 4A is a detail view of FIG. 4.

FIG. 5 is a block circuit diagram of an embodiment of the invention.

FIG. 6 is a schematic circuit diagram of a portion of a diagram of FIG. 5.

Figure 1:
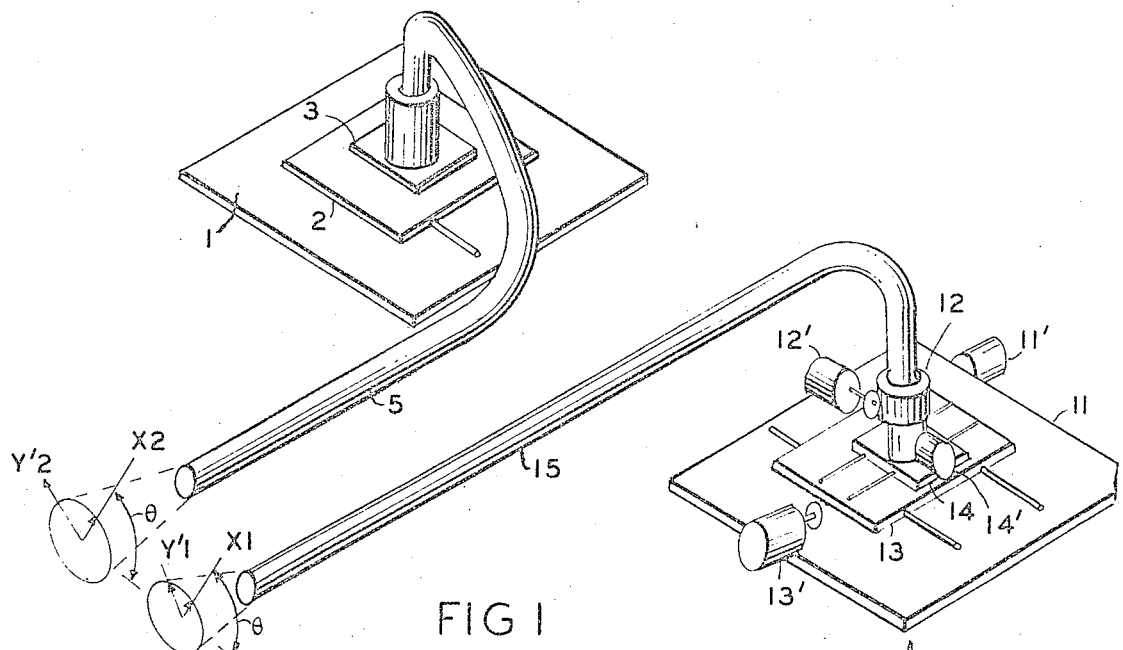
FIG. 1 is a schematic diagram of a viewer utilizing the present invention.
Figure 1A:
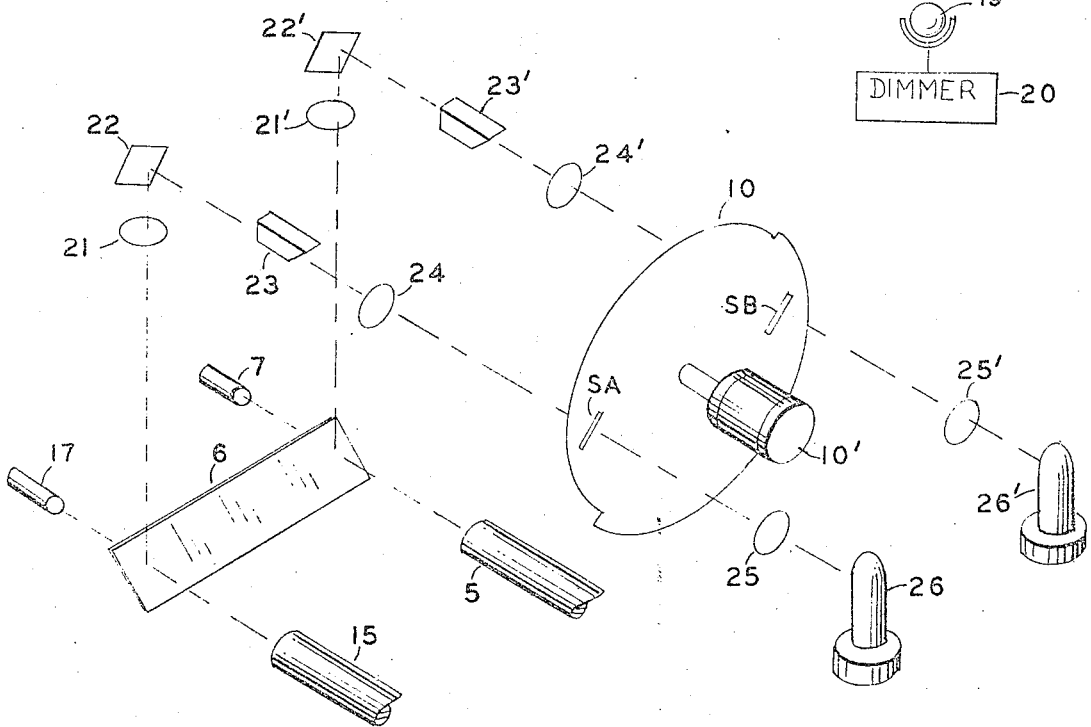
FIG. 1A is a schematic diagram illustrating the operation of the invention.

Referring to FIGS. 1 and 1A the left side system consisted of a film holder 1 with manual X and Y motion carriages 2, 3 and illuminating light. An optical pickup is connected to a fiber optic cable 5 which transmits the image to a beam splitter 6 FIG. 1A which passes the image to the left eyepiece 7 and to the scanning disc 10.

RIGHT SIDE SYSTEM

The right side system contains a motorized rotatable film holder 11 connected to be rotated by servo motor 11' and an optical system incorporating a motorized zoom lens 12 connected to be rotated by servo motor 12' and mounted on X and Y carriages 13 and 14 having servo motors 13' and 14'. The optical system transmits the image via fiber optic cable 15 to a beam splitter 6. The beam splitter passes the image to the right eyepiece 17 and to the scanning disc 10. The illumination source 19 of the right channel is controlled by an automatic solid state dimmer 20.

Left and right images are transmitted by the fiber optic cables 5 and 15 to the scanning disc by means of the mirror 6, collimating lens 21, 21', mirrors 22, 22', dove prisms 23, 23', focusing lenses 24, 24' to the scanning disc 10 which is rotated by the motor 10'. The image portions scanned by the slots or slits SA and SB pass through condenser lenses 25, 25' to photo multiplier detectors 26, 26'. These signals are then processed as will be described.

Referring also to FIG. 1A the left and right images projected on the disc are scanned by slits, as will be described. The images scanned by the slits are projected on the cathodes of two photomultipliers 26, 26'. Lenses 25, 25' are preferably used to defocus the images on the photomultiplier in order to eliminate the effects of variations of the photo cathodes sensitivity. In a complete system five photo diodes and synchronizing slits are used to synchronize the scanning disc and the electronic circuitry. The images from the right and left formats are rotated by two dove prisms 23, 23' so that the images along the X and Y axis when focused on the scanning disc conform to the X and Y slit directions of the scanning disc.

FIGS. 2A–2I illustrate the principle of operation of the scanner. As shown, two slits SA and SB are provided so that the image A of the right frame is scanned in synchronism with the image of the left frame. These images are relayed from the fiber optics end at the eyepiece assembly. Consequently, the system should maintain these two images so that they are essentially the same. It should be realized, however, that if there are any height differences, then the two images cannot be made to correspond to the average center of the second image.

The operation of the system is based on the utilization of two slits scanning both frames simultaneously in synchronism. Two photomultipliers are provided for photodetection of the light level of the slits. As shown in FIG. 2A, the two images are in correspondence. In addition, the relationship of the two slits is such that the slit of image $b$ is leading in phase that of $a$. In other words, the slit of B is slightly offset to the right of A.

For simplicity of analysis, assume that the image is a dot in the center. Then the signals $a$ and $b$ developed by the scanning slits are shown. The difference of these signals $(a-b)$ is then developed by a difference amplifier. In addition, the amplitude of that difference $(\overline{a-b})$ is computed. The amplitude $(\overline{a-b})$ is determined by changing the negative portion of the signal $(a-b)$ to a positive value.

When the slit of image $b'$ is lagging that of $a'$ as shown in FIG. 2B, then the slit of $b'$ is slightly to the right of $a'$.

The resultant signals of $a'$, $b'$, $(a'-b')$ and $\overline{(a'-b')}$ are as shown.

It may be noted that in the case mentioned above, $(\overline{a-b})$, FIG. 2A, for a leading slit phase is the same as $(\overline{a'-b'})$ for a lagging phase, or $(\overline{a-b})-(\overline{a'-b'})=0$, FIG. 2C.

Referring to FIGS. 2D and 2E let us consider the case when the object in $(b)$ is to the right of where it should be. Consequently, the two images are not in corresponce. Now that the difference $(\overline{a-b})$ has decreased for the leading phase of the scanning slit and has increased for the lagging phase. Consequently, if $(\overline{a-b})$ leading is compared to $(\overline{a'-b'})$ lagging, then an error signal is developed corresponding to offset in the relative position of the object; consequently, $(\overline{a-b})-(\overline{a'-b'})$ is negative as indicated in FIG. 2F.

It may be noted that if the error of position of the object is reversed, as shown in FIGS. 2G and 2H then the difference $(\overline{a-b})$ has increased for the leading phase and has decreased for $(\overline{a'-b'})$ the lagging phase, then $(\overline{a-b})-(\overline{a'-b'})$ is positive. Consequently, by comparing $(\overline{a-b})$ leading to $(\overline{a'-b'})$ lagging, the polarity of the signal determines whether the error is to the right or to the left.

The operation of the system integrates the error $(\overline{a-b})\text{lead}-(\overline{a'-b'})\text{lag}$. This integration is achieved by an R-C network, which averages the amplitude of the error. This DC signal is applied to a standard DC servo system, where the speed of the correction is dependent on the amplitude of the signal, and the direction of drive is dependent on polarity of the error signal.

Y ERROR

As shown in FIGS. 3A and 3B, the slits SYA and SYB and Y axis are designed in a similar manner to the X axis, except that the direction of scan is now along the Y axis. Two scans are made, one with the $b$ slit SYB' leading SYA' and another scan with the $b$ slit SYB lagging SYA. The error signal is then determined by $(\overline{a-b})-(\overline{a'-b'})$.

ROTATION ERROR (R)

Referring to FIGS. 3C and 3D, the operation of the orientation detection is provided in a similar manner to the Y axis scan. However, the scanning of the slits SRA and SRB is achieved along the Y axis, both the phase leading and phase lagging signals are developed by rotation the $(b)$ slit in clockwise SRB' and counterclockwise SRB direction. The $(\overline{a-b})$ lead is then compared to $(\overline{a'-b'})$ lag to result in the servo error signal.

MAGNIFICATION ERROR (M)

Referring to FIGS. 3E–H, the magnification error signals are developed by slits SMA and SMB scanning in the Y axis. However, these slits are placed slightly out of focus. Slit SMB is placed beyond the image plane as in FIG. 3F and the magnification is increased slightly. The scan shown in FIGS. 3G and 3H is developed when the slit SMB' is closer to the focusing lens, thus with slightly less magnification. The signal $(\overline{a-b})$ (higher magnification) is compared to $(\overline{a'-b'})$ (lower magnification) to result in a servo error signal.

The system design described has an advantage in that it is an averaging sensor, whereby the images from the right and left frames do not have to be identical. Thus, if the images observed have appreciable height, the two images are not the same. The system averages by scanning so that it offsets in one direction (D) and the other direction (—D). It then maintains the errors for D and —D the same. Consequently, if the contrast of the two images are not the same, there is always an optimum position where D and —D are equal, even though the value of this may be relatively high. It may also be concluded that any distortion in one frame relative to the other does not cause malfunction of the system, due to the averaging feature described above.

As shown in FIGS. 4 and 4A, slits are provided in disc 10 to achieve the scanning motions previously described. However, the slits are located at 45 degrees from the film axis in order to achieve the X and Y scans. In positions 1 and 1', FIG. 4, the slit travels across the Y direction in both the right and left format. The slit 1 of the right format is shown at a radius R1 while the slit of the left format 1' is offset and leads by $DY_1$. All pairs of slits in FIG. 4 are offset as shown exaggerated in FIG. 4A. The actual offsets are so small that no attempt is made to show them in FIG. 4. Note in FIG. 4A the Y slits when detected are perpendicular to the Y axis and parallel to the X axis. Therefore, they do not detect movement along the X axis. The X slits operate in reverse manner.

Ninety (90°) degrees after this scan is made, the slits in positions 6 and 6' are in operation. The offset in the Y axis is now $DY_2$. Thus, two offsets are utilized ($DY_1$ and $DY_2$) which correspond to two different fields of view. These two offsets present error signals with an offset in one direction. However, as the disc rotates 180 degrees, the slit 1' interchanges its position with slit 1. In this manner, the $DY_1$ and $DY_2$ are also reversed. Consequently, during one resolution four scans, $DY_1'$ and $DY_2'$, $-DY_1$ and $-DY_2$, are obtained. The error signal developed is computed based on $DY_2+DY_2'$ and $-DY_1-DY_1'$.

Slits 3, 3' and 8, 8' provide scanning in the X direction. In this case, position 3 is displaced by $DX_1$ and position 8 by $DX_2$. After 180 degrees rotation, the displacement will reverse. The four resultant scans are $DX_1'$, $DX_2'$, $-DX_1$ and $DX_2$.

The orientation scan is achieved by slits 4 and 9. The actual scan motion is made in the Y axis; however, there is a slight tilt D-1 and D-2 provided in slits 4 and 9. Again, when the positions are reversed by 180 degrees, the orientation error is reversed. Consequently, four scans are developed, DO', $DO_2'$, —DO, and $-DO_2$.

The magnification scan is achieved by slits 5 and 10 where slit 5 is across the right format and slit 5' is across the left format. The slits in positions 5 and 10 result in increased magnification through the use of lenses mounted over the slits. These lenses produce a change of magnification of $DM_1$ and $DM_2$ respectively. Now, after a 180 degree reversal the left format will be increased in magnification while the right format remains the same as the other slits. This reversal of increase in magnification from the right to the left results in an error signal similar to that shown in FIG. 2. Consequently, four scans are provided: $DM_1'$, $DM_2'$, $DM_1$ and $DM_2$.

The same scanning disc is utilized to develop errors for four servo systems, X, Y, M and O. This time sharing of the photomultipliers and the optics results in a unique system having a high degree of simplicity and reliability.

THE SYNCHRONIZING SLITS

In order to allow this time sharing, an electronic switch is provided. This is achieved simply by utilizing 16 synchronizing slits, A, B, C etc., located on the central part of the scanning disc and 180 degree sense determining shutter (S) as shown in FIG. 4. Five spaced light sources illuminate these slits from one side. On the other side, four photo diodes are located radially so that the light from one of the four quartets of synchronizing slits corresponding to the four error sensors, SY, SX, S$\theta$ and SM, will be actuated at one time and a fifth photo diode SS is actuated by the 180 degree sense shutter. The block diagram, FIG. 5, illustrates the utilization of each sensor to actuate consecutively X, $\theta$, M and Y, —X, —$\theta$, —M and —Y.

Referring more specifically to FIG. 5, there is shown a schematic block diagram. In this figure, one selector illuminator, one pair of synchronizing slots and one selector diode are shown. It is understood that a complete system would require five of each.

The disc 40 is rotated continuously and has a sense shutter 41 mounted about 180 degrees of the outer rim. The sense illumination source 42 transmits a light beam which is detected by the sense detector 43. One pair of slots 44 and 45 are shown. Fiber optic cables 46 and 47 provide the image illumination which is scanned and which is detected by the photo multipler detectors 48 and 49. One pair of synchronizing slots 50 and 51 is shown and one source of selector illumination 52 is shown which is adapted to transmit a beam through the selector slots which is detected by the detector 53 to provide time sharing gates for the various control signals. It is understood that five selector illuminators, five pairs of synchronizing slots, and five selector detectors are necessary in a complete system to provide the five gate signals.

The image signals are fed from detectors 48 and 49 through pre-amplifiers 48′ and 49′ to a differential amplifier 54. The differential signal $(a-b)$ is fed to the signal to amplitude converter 55 which flips over the negative portion of the signal to provide the amplitude signal $(\overline{a-b})$. These signals are fed to the various gates and switch circuits 60, 61, 62, etc. to insure that the proper signals occurring during the coincidence of proper synchronizing gate and the sense gate which is fed from the detector 43 in two forms mainly 180 degrees sense and 0 degrees sense. The 180° sense gate is connected to the 180° switch and the 0° sense gate is connected to the 0° gate switch as shown. The outputs of the switches are connected through integrators 60′, 61′, and 62′ etc. and the various pairs of signals are fed through differential amplifiers 65, 66, 67, 68. For instance, the X axis gate 60 and the DX axis gate 61 signals are applied to the differential amplifier 65 which provides the X error signal which is connected to operate the X axis motor 71 which moves the right head optical pickup.

The Y axis signals from the switches 62 and 63 are similarly fed through the differential amplifier 66, servo amplifier 71′, to Y axis motor 72.

The orientation error signals are selected by the gate switches 73, 74 and connected through integrators 73′ and 74′ to the differential amplifier 67, the output of which is connected to servo amplifier 75, the output of which drives the rotation orientation motor 76 which rotates the right optical pickup, or firm holder.

Similarly the magnification switches 80 and 81 provide signals which are fed to integrators 80′, 81′ and to the differential amplifier 68 the output of which drives the servo amplifier 82 which is connected to operate the zoom lens magnification motor 83.

If desired right illumination lamp 84 may be controlled in brightness. For this purpose signals may be taken from the pre-amplifiers 48′ and 49′ and fed to illumination pre-amplifiers 85′ and 86 and integrators 87, and 88 to the differential amplifier 89 which operates a dimming circuit 90 and controls the brightness of the lamp 84.

A speed controlled DC motor is used to rotate the scanning disc 40 at approximately ten revolutions per second. During each complete scan, sixteen selector gate signals and one sense gate signal are provided by the sensing photo diodes. These provide sixteen selection intervals correspond to a left and right side look at each of the two pairs of slots utilized for each of the four error channels.

The photomultipliers 48 and 49 are RCA type 1P21; these are selected due to their low noise level and high sensitivity relative to their size. A 500 volt DC power supply is provided with a regulation better than ½% to maintain the electronic gain of the photomultiplier essentially constant. The pre-amplifiers are standard transistorized amplifier modules. They have an essentially flat response up to 2,000,000 c.p.s. As used, the output of the pre-amplifier is low impedance signal, allowing the use of an eight foot cable between the pre-amplifiers at the eyepiece assembly and the electronic rack.

The outputs of the preamplifiers are applied to a difference amplifier. If the signal from the left frame is $(a)$ and the right frame signal is $(b)$ then the output is $(a-b)=D$. An emitter follower buffer amplifier is used to apply the signal D to a signal to amplitude converter which is used to reverse the negative portion of the signal, resulting in $\overline{D}=\overline{(a-b)}$. An emitter follower is used in order to minimize the distortion due to the inherent non-linear input impedance of the signal to amplitude converter.

The output $\overline{D}$ is applied to an electronic switch, which is actuated by the gating photo diodes. The coincidence of a sense gate signal and a selector gate signal are required to enable the output $\overline{D}$ to be distributed to the proper integrator. Thus, when an X scan is performed, an X selector gate signal and a 0 degree sense gating signal enable the signal $\overline{D}$ to be distributed to the X integrator, and when DX scan is performed an X selector gate signal and a 180 degree sense gating signal, generated by an inverter amplifier, enable the signal $\overline{D}$ to be distributed to the DX integrator.

The outputs of the X and DX integrators are subtracted by a low-drift modular difference amplifier giving a resultant output of $\overline{a-b}-\overline{a'-b'}$ which represents the servo error signal.

The four correction axes utilize 10 watt two phase 60 cycle servo motors equipped with appropriate gear heads. Standard chopper input vacuum tube servo power amplifiers are used to drive the motors.

The illumination control system is operated by the difference amplifier $D_2$ after preamplification and integration. Thus, if the illumination level is the same for the right and left frames, the average DC level of the right and left frames are equal, resulting in D— zero. Any error in the average value of D is applied to a solid state dimmer amplifier, which increases or decreases the illumination of one of the channels to make it equal to the other.

FIG. 6 shows a typical schematic circuit diagram of a portion of the circuit including the differential amplifier 54 and signal to amplitude converter 55 of FIG. 5. Signals are fed from the pre-amplifiers 48′ and 49′ through suitable coupling circuits to the differential amplifer 54 which comprises the stages Q1 and Q2. The output of the differential amplifier is a difference signal such as the waveform Z. This signal is fed through an emitter follower circuit 91 which comprises the stages Q3 and Q4. The output of this circuit is fed to the signal to amplitude converter 55 which comprises the stages Q5 and Q6 which operate to change the negative portion of the signal to a positive, like the waveform W. This output signal then is connected through suitable coupling circuits to the photo switch gates 60, 61, etc. All of the remaining components of FIG. 5 are conventional.

The present invention is automatic once the operator made the initial stereo setting. Automatic correction is provided for displacement errors in the X and Y axes, errors, in angular position and differences in magnification. In addition, it is proposed to control the intensity of the light sources so that the left and right images were observed at equal levels of illumination. If the images have no contrast such as water images, the automatic system would not operate and the system would revert to normal control for the X and Y carriages, but magnification and angular adjustments would remain at their last setting. The reversion of the X and Y automatic tracking system to manual control is accomplished with a suitable time delay so that in the event of momentary loss of signal information, such as that caused by a cloud, the system will continue to track at the last setting until after the delay and be able to control automatic tracking when the signal is again present.

Many modifications may be made by those who desire to practice the invention without departing from the scope thereby which is defined by the following claims:

1. In a stereo viewer of the type having first and second movable optical pickups adapted to transmit left and right images from stereo film,
first and second fiber optic cables connected to said first and second pickups at one end of said cables,
servo motor means connected to control said second pickup along coordinate axes,
means to automatically align said second optical pickup on an image within the field of view of said first pickup comprising,
means located at the other end of said cables to scan said images,
means adjacent said scanning means to detect left and right scanning signals,
means connected to said detector means to compare said left and right scan signals,
means connected to said comparing means to generate servo control signals proportional to any misalignment of said optical pickups,
and means to feed said servo control signals to the servo motor means of the second optical pick-up.

2. Apparatus as in claim 1 wherein said scanning means is a scanning disc having slots therein, said scanning disc being connected to a motor which is adapted to rotate said disc.

3. Apparatus as in claim 2 wherein said detector means comprises at least one photo-multiplier.

4. Apparatus as in claim 2 wherein said scanning disc has a plurality of slots adapted to provide scan signals which are proportional to misalignment along a pair of coordinate axes.

5. Apparatus as in claim 4 wherein said scanning slots adapted to provide signals proportional to rotation misalignment of said film.

6. Apparatus as in claim 5 wherein said scanning disc also has slots adapted to provide signals proportional to difference in magnification of said images.

7. Apparatus as in claim 6 having means to time gate said comparing means so as to provide multiplex servo control signals.

References Cited

UNITED STATES PATENTS

| | | | |
|---|---|---|---|
| 2,901,941 | 9/1959 | Brumley | 350—136 X |
| 2,912,761 | 11/1959 | Woodward et al. | 250—220 X |
| 2,960,006 | 11/1960 | Bartorelli | 350—136 |
| 2,989,890 | 6/1961 | Dressler | 356—167 |
| 3,432,674 | 3/1969 | Hobrough | 250—220 |

JAMES W. LAWRENCE, Examiner

V. LAFRANCHI, Assistant Examiner

U.S. Cl. X.R.

250—208, 220, 234; 350—136, 137; 356—167